United States Patent
Torkkeli et al.

(12) 
(10) Patent No.: US 10,914,939 B2
(45) Date of Patent: Feb. 9, 2021

(54) MEMS REFLECTOR SYSTEM

(71) Applicant: MURATA MANUFACTURING CO., LTD., Nagaokakyo (JP)

(72) Inventors: Altti Torkkeli, Tuusula (FI); Matti Liukku, Helsinki (FI)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 122 days.

(21) Appl. No.: 16/043,359

(22) Filed: Jul. 24, 2018

(65) Prior Publication Data
US 2019/0064508 A1     Feb. 28, 2019

(30) Foreign Application Priority Data

Aug. 23, 2017  (FI) ..................... 20175752

(51) Int. Cl.
*G02B 26/10* (2006.01)
*G02B 26/08* (2006.01)
(Continued)

(52) U.S. Cl.
CPC ..... *G02B 26/0858* (2013.01); *G02B 26/0841* (2013.01); *G02B 26/101* (2013.01); *H02N 2/108* (2013.01); *H02N 2/145* (2013.01)

(58) Field of Classification Search
CPC .... G02B 26/0841; G02B 26/08; G02B 26/10; G02B 26/0858; G02B 26/101;
(Continued)

(56) References Cited

U.S. PATENT DOCUMENTS

| 7,329,930 B2* | 2/2008 | Hung | B81B 3/0045 |
|---|---|---|---|
| | | | 257/414 |
| 8,035,874 B1* | 10/2011 | Fu | G02B 26/0841 |
| | | | 359/199.2 |

(Continued)

FOREIGN PATENT DOCUMENTS

| CN | 1490240 A | 4/2004 |
|---|---|---|
| CN | 1969217 A | 5/2007 |

(Continued)

OTHER PUBLICATIONS

Finnish Search Report dated Mar. 6, 2018 corresponding to Finnish Patent Application No. 20175752.

*Primary Examiner* — Balram T Parbadia
(74) *Attorney, Agent, or Firm* — Squire Patton Boggs (US) LLP

(57) ABSTRACT

A compact and robust microelectromechanical reflector system that comprises a support, a reflector, a peripheral edge of the reflector including edge points, and suspenders including piezoelectric actuators and suspending the reflector from the support. Two pairs of suspenders are fixed from two fixing points to the support such that in each pair of suspenders, first ends of a pair of suspenders are fixed to a fixing point common to the pair. A first axis of rotation is aligned to a line running though the two fixing points, and divides the reflector to a first reflector part and a second reflector part. In each pair of suspenders, a second end of one suspender is coupled to the first reflector part and a second end of the other suspender is coupled to the second reflector part.

9 Claims, 10 Drawing Sheets

(51) Int. Cl.
*H02N 2/10* (2006.01)
*H02N 2/14* (2006.01)

(58) Field of Classification Search
CPC .............. G02B 26/0833; G02B 26/105; G02B 26/085; G02B 27/0031; H02N 2/108; H02N 2/145; B81B 2201/042; H04N 3/08
See application file for complete search history.

(56) References Cited

U.S. PATENT DOCUMENTS

| | | | |
|---|---|---|---|
| 2004/0081391 A1 | 4/2004 | Ko et al. | |
| 2006/0132883 A1* | 6/2006 | Saitoh | G02B 26/0841 359/224.1 |
| 2008/0285103 A1* | 11/2008 | Mizumoto | G02B 26/0858 359/199.1 |
| 2010/0195180 A1* | 8/2010 | Akanuma | G02B 26/0858 359/200.8 |
| 2012/0320379 A1 | 12/2012 | Hofmann et al. | |
| 2013/0141768 A1* | 6/2013 | Krylov | B81B 3/0018 359/199.2 |
| 2014/0300942 A1* | 10/2014 | Van Lierop | B81B 3/007 359/199.2 |
| 2015/0286048 A1 | 10/2015 | Chen et al. | |

FOREIGN PATENT DOCUMENTS

| | | |
|---|---|---|
| CN | 101950079 A | 1/2011 |
| JP | 2001075042 A | 3/2001 |
| JP | 2011-227216 A | 11/2011 |
| JP | 2012163828 A | 8/2012 |
| JP | 2013003583 A | 1/2013 |
| WO | WO 2004/049034 A1 | 6/2004 |
| WO | 2011061914 A1 | 5/2011 |

* cited by examiner

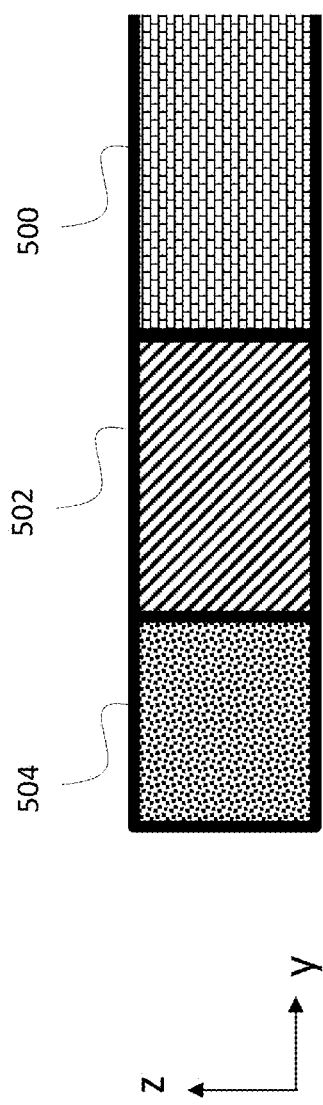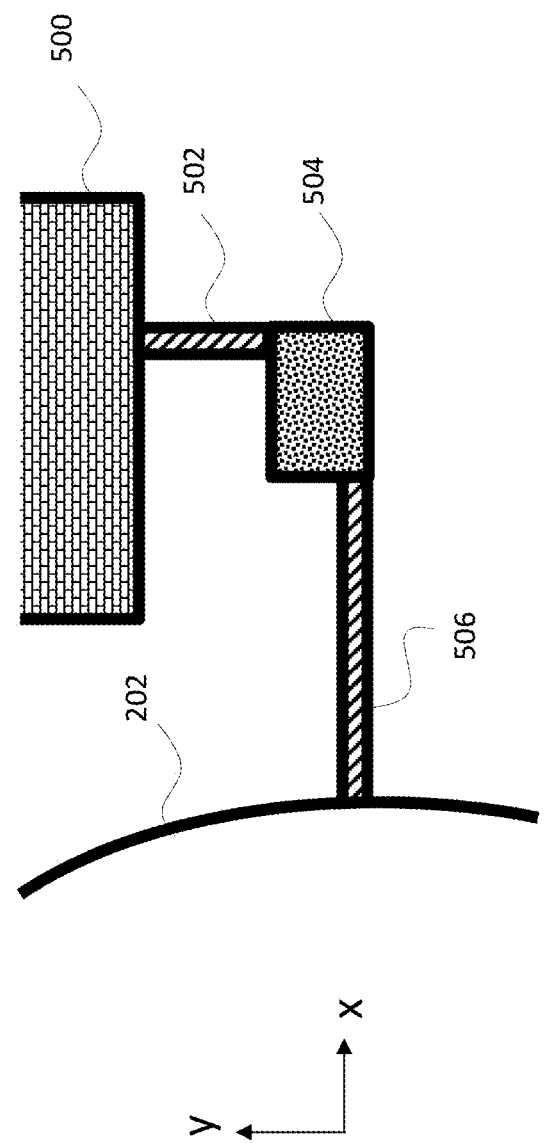

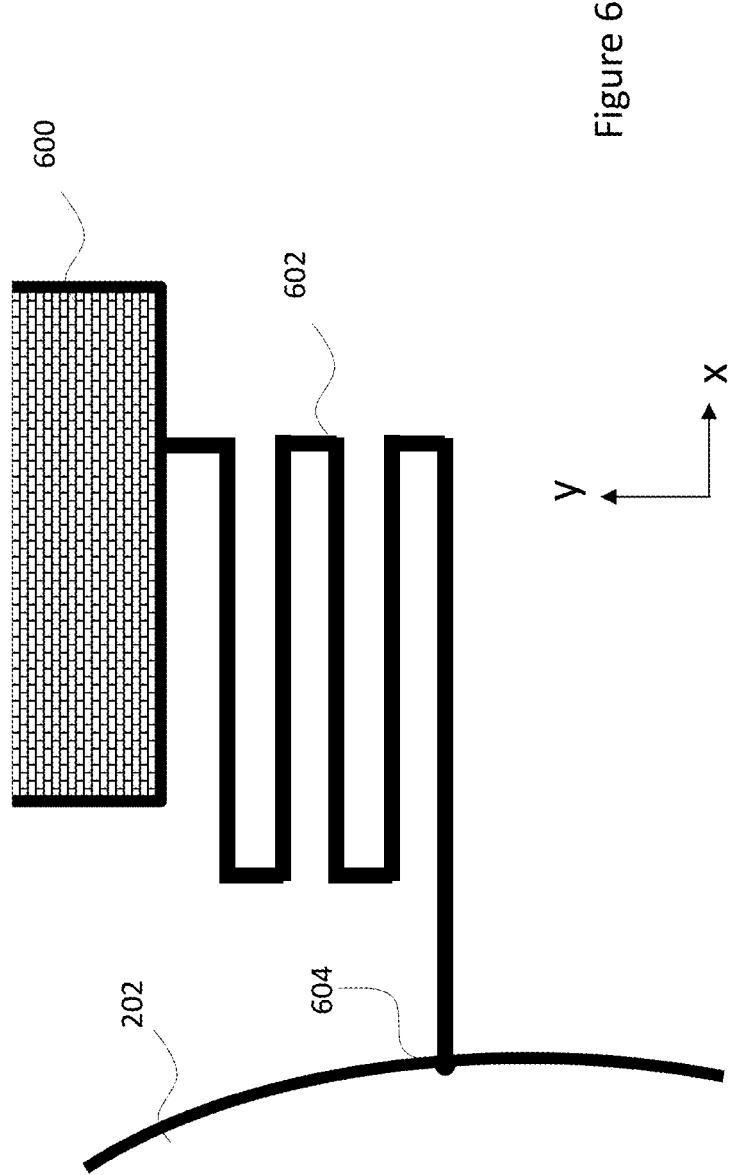

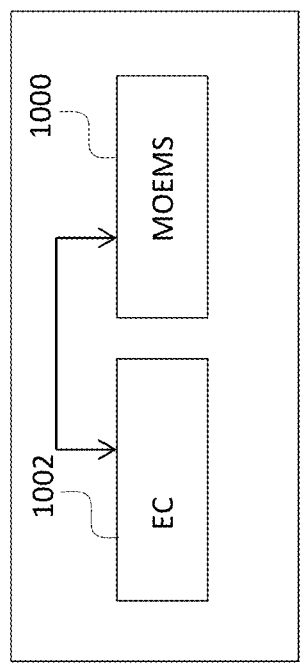

MEMS REFLECTOR SYSTEM

FIELD OF THE DISCLOSURE

This disclosure relates to microelectromechanically actuated reflector systems.

BACKGROUND OF THE DISCLOSURE

Microelectromechanical (MEMS) reflectors can be used in imaging devices such as light-detecting and ranging sensors (LIDARs). A MEMS reflector is a planar element that contains at least one planar reflecting surface, and is therefore capable of reflecting incoming light beams towards the surrounding environment. A MEMS reflector system may comprise at least one moving reflector which can reflect light beams from a laser emitter. Additional fixed reflectors or lenses may be included in the light path between the moving reflector and the environment. Returning light beams can be reflected inward towards a photodetector by the same fixed reflectors and the moving reflector, which reflected the outgoing beam.

FIG. 1 shows a simplified two-dimensional sketch of a reflector system with a planar moving reflector 12, and a laser emitter 11 that emits a light beam 111 towards it. The moving reflector 12 is suspended from a support 13 in such a way that it can be tilted in respect of the incoming light beam 111. The reflector 12 is shown with a thick solid line in the position where it has tilted, and the light beam 121 reflected from planar reflector in this position is shown with a thinner solid line.

Scanning of an image area can be generated by tilting the reflector in a suitably coordinated and timed order. In a simple scanning mode, the moving reflector 12 can be arranged to oscillate about two orthogonal axes of rotation. Both oscillations can be excited and driven simultaneously, and the resulting position of the mirror is a superposition of the oscillation modes. Advantageously the oscillation modes are operated resonantly.

Typical prior art dual-axis scanners apply suspension systems where a set of two gimbals separates the two oscillation modes from each other. For example, document US 2015/0286048 A1 discloses a conventional gimbal structure, a Lissajous dual-axis scan component and a scan frequency generation method thereof. The component comprises fast axes and slow axes, a mirror, a mass and a support. The mirror is disposed at the center and connected to the mass through the pair of fast axes, and the mass is connected to the support though the pair of slow axes. When the component is driven by an actuator, the fast axes twist at a fast-axial resonance frequency, and the slow axes twist at a slow-axial resonance frequency, thus bringing forth scan projections.

The gimbal sets occupy the same planar area as the reflective surface, which means that a smaller portion of the available MEMS chip area remains available for the mirror. Accordingly, the gimbal suspension is not optimal for solutions where the size of the MEMS chip of the reflector system is relevant. In addition, the gimbal needs to be large enough to avoid undesirable overcoupling movement, but large gimbal mass easily results in high sensitivity to external vibrations and shock effects. The gimbal suspension also exhibits various parasitic modes, which further complicate the design of the structure. Furthermore, in the nested gimbal structure, routing of electrical connection to the inner gimbal must be made on top of the outer gimbal spring axes. Usually the springs are narrow and sensitive to process deformations, which makes patterning layers on them very difficult.

An alternative solution is disclosed in document US2012/0320379 A1 that describes a deflection device for a micromirror scanner. The structure does not include a gimbal, but an inert surrounding support and a mirror plate supported by a suspension mount. The suspension mount structures shown in US2012/0320379 A1 are close to symmetrical, and differ only so that X and Y resonance mode frequencies can differ by a designed imaging frame rate (60 Hz). Such small dimensional differences are difficult to obtain in a controlled way in mass production because of manufacturing tolerances. Furthermore, the structure applies comb structures to measure phase positions of the micromirror. This is quite inefficient, as the overlap of the vertical comb electrode surfaces and thus the measured capacity does not truly correspond with the motion when amplitudes larger than out-of-plane dimension of the device layer are applied. However, accurate detection of the position of the reflector is very important in lidar applications where returning optical signals are detected, and the direction of the detected beam needs to be known exactly. The flexible parts of the shown suspension structures also flex in many directions and are therefore easily responsive also to external shocks and vibrations. It is likely that future lidar applications will be used in vehicles and other challenging environments where such sensitivity is not acceptable. Furthermore the support of the resonator is unbalanced. In unbalanced resonators, the support structures deform in large amplitude resonance vibration which causes energy dissipation and lowers the resonator Q value.

BRIEF DESCRIPTION OF THE DISCLOSURE

An object of the present disclosure is to provide an apparatus and an associated method for overcoming, or at least alleviating some of the above problems.

The claims define a microelectromechanical reflector system that comprises a support, a reflector, a peripheral edge of the reflector including edge points, and suspenders including piezoelectric actuators and suspending the reflector from the support. Two pairs of suspenders are fixed from two fixing points to the support such that in each pair of suspenders, first ends of a pair of suspenders are fixed to a fixing point common to the pair. A first axis of rotation is aligned to a line running though the two fixing points, and divides the reflector to a first reflector part and a second reflector part. In each pair of suspenders, a second end of one suspender is coupled to the first reflector part and a second end of the other suspender is coupled to the second reflector part.

Embodiments of the invention disclose also an optical device that includes the microelectromechanical reflector system. Features of the reflector system enable a compact and robust device structure. Further advantages achievable with the disclosed reflector system are discussed in more detail with exemplary embodiments of the invention.

BRIEF DESCRIPTION OF THE DRAWINGS

In the following the disclosure will be described in greater detail by means of exemplary embodiments with reference to the accompanying drawings, in which:

FIGS. 5A and 5B illustrate two detail views of an exemplary coupling between a suspender and an edge point;

FIG. 6 shows an alternative edge coupling configuration;

FIG. 10 illustrates a scheme of an optical MEMS device in a device package.

DETAILED DESCRIPTION OF THE DISCLOSURE

Figure 1:
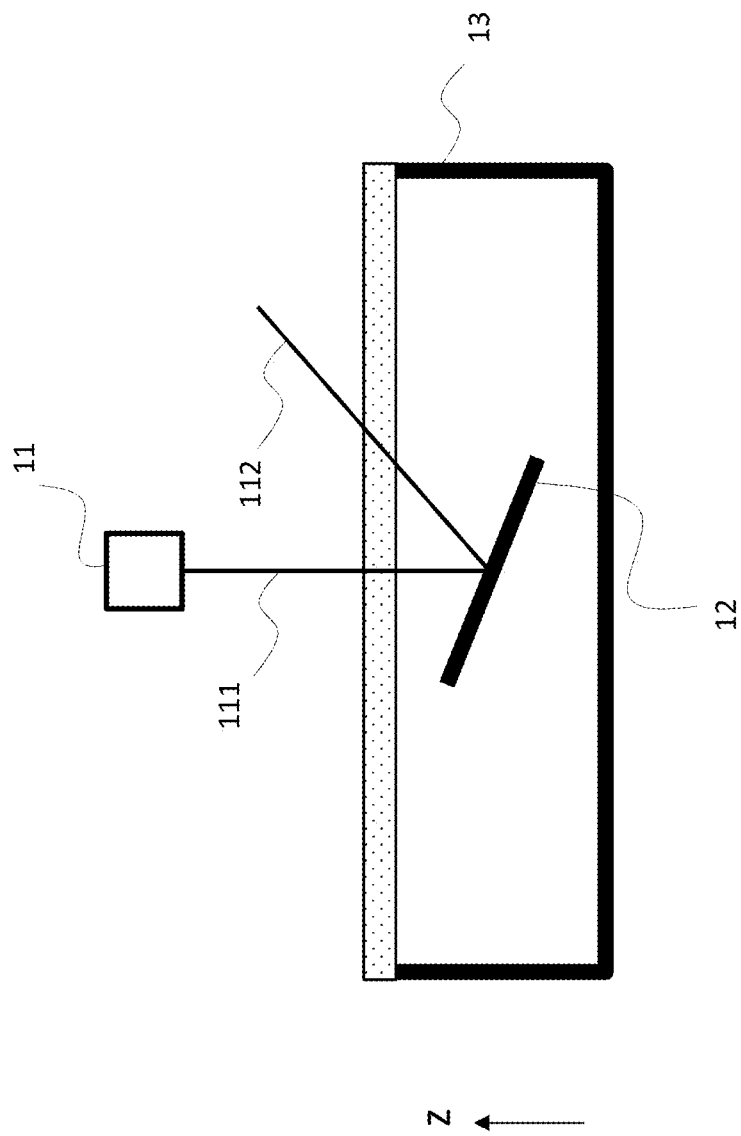
FIG. 1 shows a simplified two-dimensional sketch of a reflector system.
Figure 2:
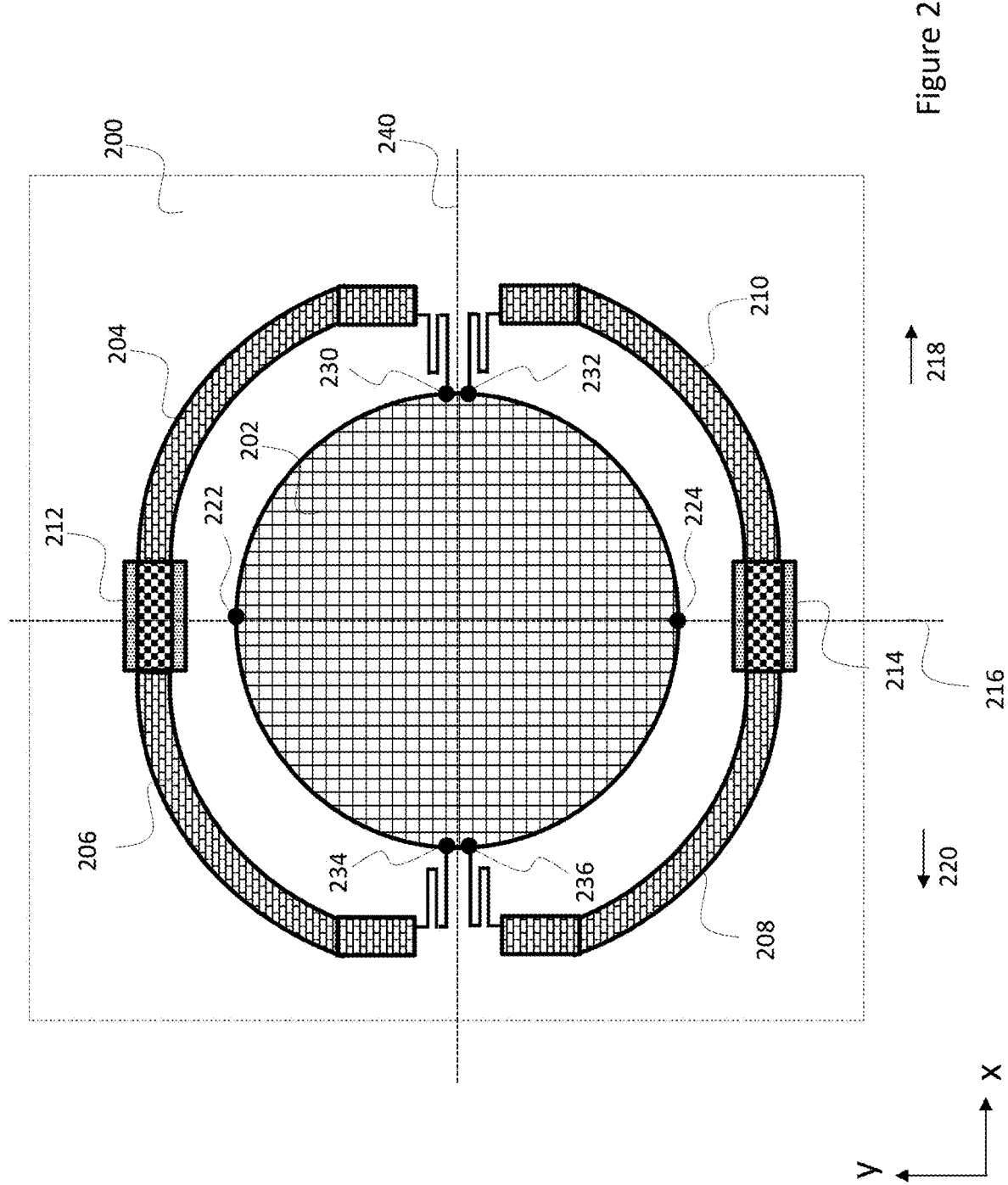
FIG. 2 shows an example of an improved microelectromechanical reflector system.

FIG. 2 shows an example of an improved microelectromechanical reflector system that in an optimal way enables a planar reflector to oscillate about two orthogonal axes of rotation. The reflector system comprises a support 200, a reflector 202 and suspenders 204, 206, 208, 210 suspending the reflector from the support.

The term support 200 refers herein to a mechanical element that may be part of the MEMS scanning reflector device that includes the reflector system, or a separate element rigidly fixed to the MEMS scanning reflector device. Accordingly, the support thus represents here any element that provides a rigid, locally inert reference to which other elements of the reflector system can be fixed, or from which other elements of the reflector system can be suspended. The support can, but does not mandatorily include a frame that surrounds the reflector. In some embodiments of the reflector system, the support is a supporting layer underneath and separated by an out-of-plane gap from a device layer of the reflector and the suspenders. The support and the device layer may be coupled through one or more protruding fixing points 212, 214.

The term reflector 202 refers herein to any element that includes a reflective surface that returns back an incident wavefront of light. The law of reflection states that for each incident ray, the angle of incidence equals the angle of reflection, and the incident, normal and reflected directions are coplanar. In microelectromechanical reflector systems, a reflective surface of the reflector may be implemented, for example, by means of a silicon plate coated with a reflective coating. The reflective coating may include, for example, one or more metal thin film layers, such as aluminium, silver, gold or copper films. Alternatively, the coating may comprise a stack of one or more dielectric films with different refractive indexes, where the films are arranged so that the stack reflects light. Advantageously, the reflective surface is planar.

Position or orientation of a rigid element suspended from another rigid element has at least one degree of freedom. The term suspender 204, 206, 208, 210 thus refers herein to a mechanical part that suspends the reflector 202 to the support 200 and provides at least one degree of freedom between the support and the reflector. In other words, when the reflector is attached to the support with suspenders, parts of the suspenders and the reflector carried by the suspenders can move in relation to the support. A suspender supports the weight of the reflector, but it also moves the reflector in relation to the support during actuation. The suspenders can be, for example, silicon beams formed from the same silicon substrate layer as the reflector plate.

The suspenders suspending the reflector from the support include piezoelectric actuators. The term actuator refers here to a piezoelectric component which undergoes physical deformation in response to a voltage applied to the component. An actuator can be used to drive oscillating movement when it is controlled with a periodic AC voltage signal. A bending piezoelectric actuator for a scanning MEMS reflector may include a silicon layer coated with piezoelectric layers and conductive layers which transmit the voltage signal to the piezoelectric layers. An approximately 50 μm thick layer of silicon is sufficiently thin to bend with the piezoelectric material when a voltage is applied. The bending piezoelectric actuators include a piezoelectrically active layer, such as aluminium nitride, to facilitate actuation movement. The bending piezoelectric actuator may also include metal electrode layers on two sides of the piezoelectrically active layer so that the actuation movement can be controlled by voltage signals. The electrodes may, for example, be prepared from molybdenum, aluminium or titanium.

In the microelectromechanical reflector system of FIG. 2, two pairs of suspenders are fixed from two fixing points to the support such that in each pair of suspenders, first ends of a pair of suspenders are fixed to a fixing point common to the pair. Fixing refers herein to a mechanically rigid connection where an end of a suspender is securely placed or fastened to a fixing point. The fixing points 212, 214 provide also a route for leads of electrical connection to the suspenders. The suspenders of a pair of suspenders can be connected together, or they can have separate connections for separate signaling controls. FIG. 2 shows two pairs of suspenders. A first pair of suspenders is formed of a first suspender 204, and a second suspender 206. A second pair of suspenders is formed of a third suspender 208, and a fourth suspender 210. A first end of the first suspender 204 and a first end of the second suspender 206 are fixed from a first fixing point 212 to the support 200. The first end of the first suspender 204 and the first end of the second suspender 206 are thus both mechanically coupled to the same fixing point 212, which means that the first fixing point 212 is common to the first pair of suspenders 204, 206. Correspondingly, a first end of the third suspender 208 and a first end of the fourth suspender 210 fixed from a second fixing point 214 to the support 200. The first end of the third suspender 208 and the first end of the second suspender 210 are thus both mechanically coupled to the same fixing point 214, which means that the second fixing point 214 is common to the pair second of suspenders 208, 210.

If the reflecting surface of the reflector in non-actuated state is considered to align to a virtual reference plane, the resilient suspenders and the piezoelectric actuators on the suspenders enable second ends of the four suspenders to displace in out-of-plane direction. These displacements may be applied to induce the reflector to oscillate about two axes of rotation. A first axis of rotation 216 is aligned to a line running though the two fixing points 212, 214. The first axis of rotation 216 divides the reflector 202 to a first reflector part 218 and a second reflector part 220. In each pair of suspenders, a second end of one suspender is coupled to the reflector in the first reflector part 218, and a second end of the other suspender is coupled to the reflector in the second reflector part 220.

In the microelectromechanical reflector system of FIG. 2, a peripheral edge of the reflector includes edge points. A first edge point 222 and a second edge point 224 coincide with the first axis of rotation 216. The first fixing point 212 is adjacent to the first edge point 222, but is separated therefrom by an in-plane gap so that the first edge point can move in out-of-plane direction in respect of the first fixing point. The second fixing point 214 is adjacent to the second edge point 224, and is separated therefrom by an in-plane gap so that also the second edge point 224 can move in out-of-plane direction in respect of the second fixing point 214.

A third edge point 230 and a fourth edge point 232 are located in an edge of the first reflector part 218. Correspondingly, a fifth edge point 234 and a sixth edge point 236 are located in an edge of the second reflector part 220. The virtual reference plane can be considered to be a plane determined by any three of the four edge points 230, 232, 234, 236 when the reflector is in non-actuated state.

A second end of the first suspender 204 is coupled to the third edge point 230, and a second end of the second suspender 206 is coupled to the fifth edge point 234. Correspondingly, a second end of the third suspender 208 is coupled to the sixth edge point 236, and a second end of the fourth suspender 210 is coupled to the fourth edge point 232. The third edge point 230 and the fourth edge point 232 are separated by a non-zero distance. Correspondingly, the fifth edge point 234 and the sixth edge point 236 are separated by a non-zero distance. A line running through the third edge point 230 and the fifth edge point 234 is parallel to a line running through the fourth edge point 232 and the sixth edge point 236. The second axis of rotation 240 is parallel to the line running through the third edge point 230 and the fifth edge point 234, and also parallel to the line running through the fourth edge point 232 and the sixth edge point 236. The second axis of rotation 240 runs through the distance separating the third edge point 230 and the fourth edge point 232, and through the distance separating the fifth edge point 234 and the sixth edge point 236. In FIG. 2, the first axis of rotation 216 is shown in alignment to the Y direction, and the second axis of rotation 240 is shown in alignment to the X direction, both in the virtual plane of reference that aligns with the page of the drawing.

The oscillation of the reflector 202 about the first axis of oscillation can be excited by applying a periodic AC voltage to the elongate piezoelectric actuators extending on the elongate suspenders 204, 206, 208, 210. For this, the microelectromechanical reflector system typically includes a control device (not shown) that is electrically connected to the piezoelectric actuators of the suspenders and configured to provide actuation voltages operating the actuators in a manner controlled by design. A first mode of oscillation refers here to oscillation of the reflector 200 about the first axis of rotation 216 (Y mode oscillation). A second mode of oscillation refers here to oscillation of the reflector about the second axis of rotation 240 (X mode oscillation). The first mode of oscillation can be bought about by applying a periodic actuation signal with the same phase on the first suspender 204 and the fourth suspender 210. When actuated, the fixed first ends of the suspenders 204, 210 remain fixed to their respective fixing points 212, 214, but the second ends of the suspenders 204, 210 displace simultaneously in the out-of-plane direction. At the same time, the same periodic actuation signal but in the opposite phase (phase difference 180 degrees) can be applied on the second suspender 206 and the third suspender 208. Due to this, the first part 218 of the reflector is driven to move up when the second part 220 of the reflector is driven to move down, and vice versa, resulting in a periodic oscillation of the reflector about the first axis of oscillation 216.

Correspondingly, the second mode of oscillation can be bought about by applying a periodic actuation signal with the same phase on the first suspender 204 and the second suspender 206. When actuated, the fixed first ends of the suspenders 204, 206 remain fixed to their fixing point 212, but the second ends of the suspenders 204, 206 displace simultaneously in the out-of-plane direction. At the same time, the same periodic actuation signal but in the opposite phase (phase difference 180 degrees) can be applied on the third suspender 208 and the fourth suspender 210. Due to this, the third edge point 230 and the fifth edge point 234 of the reflector move up, while the fourth edge point 232 and the sixth edge point 236 of the reflector move down, and vice versa. This results in a periodic oscillation of the reflector about the second axis of oscillation 240.

A general objective of reflector systems is to ensure that the power consumption required for achieving the oscillation is optimized. The greatest amplitude response is achieved by designing the reflector to operate in resonance mode, i.e. so that oscillation about the first axis of rotation and oscillation about the second axis of rotation occur in their respective mechanical resonance frequencies. The control device is thus configured to provide control signals to simultaneously drive the reflector 202 to a first rotary oscillation about the first axis of rotation 216 in a first resonance frequency F1, and to a second rotary oscillation about a second axis of rotation 240 in a second resonance frequency F2. The first axis of rotation 216 and the second axis of rotation are orthogonal, so the resulting position of the reflector 202 is a superposition of the first rotary oscillation and the second rotary oscillation.

Figure 3:
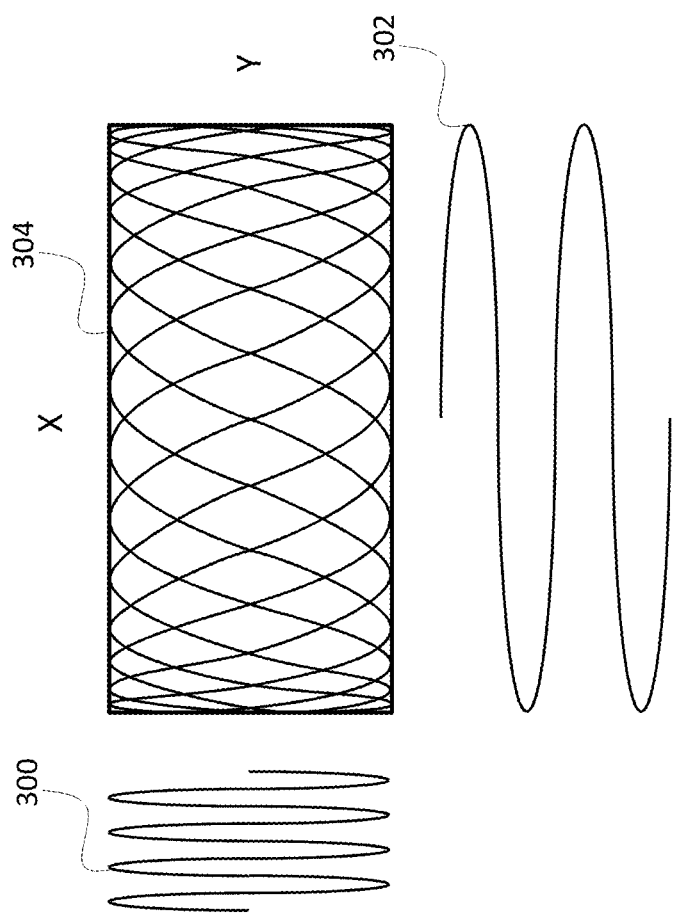
FIG. 3 shows a Lissajous scan pattern.

When a beam of light incident on the reflective surface of the reflector 202 is reflected back, the direction of the reflected beam depends on the position of the reflector at the time of the incidence. Advantageously the first rotary oscillation and the second rotary oscillation are arranged to position the reflector such that the reflected beam moves along a controlled scan pattern. An advantageous pattern is illustrated in FIG. 3 that shows a Lissajous scan pattern that is generated by actuating the scanner with two single-tone harmonic waveforms of constant frequency and amplitude. In other words, the Lissajous pattern results from superposition of two orthogonal modes of oscillation. In the reflector system of FIG. 2, the two orthogonal modes are the first resonance frequency and the second resonance frequency. A Lissajous pattern is formed when the first resonance frequency F1 and the second resonance frequency F2 are different but integer multiples of a common numerical value. FIG. 3 shows separately a first rotary oscillation 300 about the first axis of rotation 216 (Y mode oscillation), a second rotary oscillation 302 about the second axis of rotation 240 (X mode oscillation), and a scan pattern 304 resulting from a superposition of the two modes of oscillation.

As may be referred from FIG. 2, actuation of the X mode oscillation is leveraged. This means that the distance from a line connecting the third edge point 230 and the fifth edge point 234 to the second axis of rotation 240 is shorter than the distance from the first edge point 222 to the second axis of rotation 240. As the reflector is a rigid object, the second axis of rotation acts as a fulcrum, the distance from the first edge point 222 to the second axis of rotation 240 corresponds to the load arm of a speed multiplier lever (third class lever), and the distance from the line connecting the third edge point 230 and the fifth edge point 234 to the second axis of rotation 240 corresponds to the effort arm of the speed multiplier lever. Accordingly, a small out-of-plane displacement at the level of the third edge point 230 and the fifth edge point 234 results in a larger out-of-plane displacement at the level of the first edge point 222.

In the configuration of FIG. 2, the Y mode oscillation is not leveraged. The largest out-of-plane displacements that limit the deflection angles in the Y mode oscillation take place in the second ends of the suspenders. This means that in the configuration of FIG. 2, the X mode oscillation may have larger amplitudes than the Y mode oscillation, as shown in FIG. 3. This is, however, no problem, as the image area to be scanned in many relevant applications, like lidars, typically requires a larger deflection angle in one direction than in the other.

Figure 4:
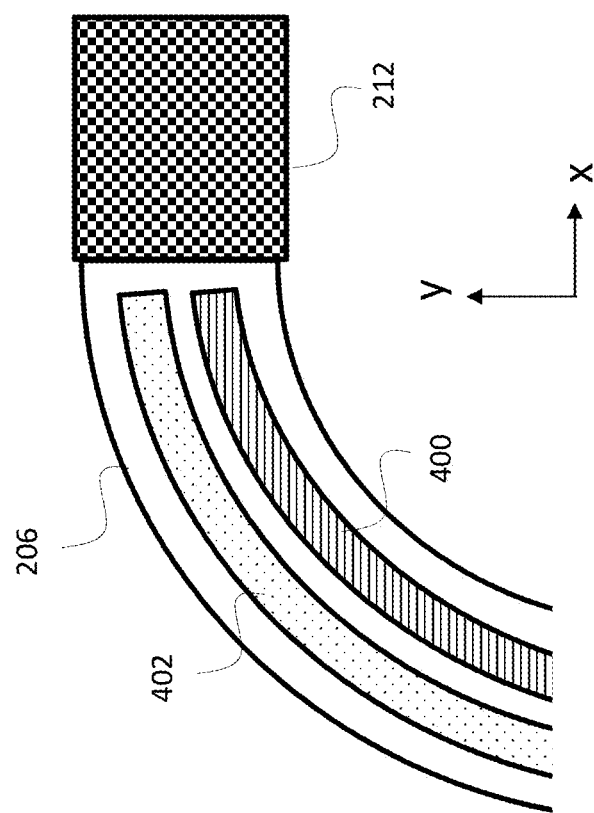
FIG. 4 illustrates an exemplary actuation and sense arrangement.

As discussed above, in many applications it is vital to be able to continuously know the position of the reflector. In the configuration of FIG. 2 this is easily achieved by sensing the realized displacements of the suspenders. For this, one or more, advantageously all of the suspenders can be provided with piezoelectric detector elements, in addition to the piezoelectric actuators. FIG. 4 illustrates an exemplary arrangement in which an elongate piezoelectric actuator 400 and a piezoelectric detection element 402 extend electrically separately but mechanically coupled side by side on the second suspender 206 of FIG. 2. The electrical connection to the control element for actuation and detection voltages to the piezoelectric elements can be led through the first fixing point 212.

The disclosed structure has many advantages. As evident from FIG. 2, the optically inactive area of the structure is very small, as both X mode oscillation and Y mode oscillation can be actuated with a set of four elongate suspenders surrounding the reflector in the device layer. The leveraged X mode oscillation also enables larger deflection angle, because the part moving highest in the out-of-plane direction is the edge of the reflector, not an edge of a suspender. The X mode oscillation is balanced, and does not produce moment to the support. This enables higher quality factor and therefore good resolution of frequency. It also provides a high degree of immunity to environmental vibrations and immunity to interference from surrounding structural resonances, and thereby improves long-term performance. Balanced resonator support is also more rigid and increases the efficiency of how drive excitation force can be transformed into mirror movement.

Sensing of the displacements can be implemented in a very accurate manner by differential detection. Let us assume that the first suspender 204 is provided with a first detection element that generates a first detection signal S1 in response to displacements of the first suspender. Correspondingly, a second detection element generates a second detection signal S2 in response to displacements of the second suspender 206, a third detection element generates a third detection signal S3 in response to displacements of the third suspender 208, and a fourth detection element generates a fourth detection signal S4 in response to displacements of the fourth suspender 210. In this case, a sense signal SY representing Y mode oscillation can be generated as:

$$SY=(S1+S4)-(S2+S3)$$

Correspondingly, a sense signal SX representing X mode oscillation can be generated as:

$$SX=(S1+S2)-(S3+S4)$$

In conventional solutions, sensing the modes of oscillation is done by separating the two different frequency signals electronically. If the resonance frequencies of X mode oscillation and Y mode oscillation are close to each other, filtering of the signals becomes more complicated. Accuracy of filters may not be adequate and additional constraints are posed to the circuit design of the control element. In many important applications, accuracy of sensing of the reflector position is very important, so the possibility to directly separate X mode motion of the reflector from the Y mode motion by differential detection is very important.

In an aspect, the coupling between a second end of a suspender and an edge point to which the suspender is coupled includes a first coupling spring that relays deflection of the second end of the suspender to the edge point in the out-of-plane direction, and responds flexibly to deflection of the second end of the suspender in at least one in-plane direction parallel to the first plane. This reduces the possibility of breakage of the coupling between the suspender and the reflector, caused by shortening of the suspender in the X and Y directions when it bends in the out-of-plane Z direction. FIG. 2 illustrates an example structure providing such coupling.

FIGS. 5A and 5B illustrate two detail views of an exemplary coupling between the second end of the first suspender 204 and the third edge point 230. FIG. 5A shows in a side view of the structure, meaning a view parallel to the virtual reference plane (the plane of the device layer). FIG. 5B shows a top view of the structure, meaning a view normal to the virtual reference plane. FIG. 5A show an end part 500 of the second end of the first suspender, a first bending spring 502 and a coupling element 504. FIG. 5B shows the same elements, and also a second bending spring 506 that completes the coupling to the reflector. The thickness of the elements 500, 502, 504 (dimension normal to the virtual plane of reference) is designed to be such that the elements couple rigidly in the out-of-plane direction, i.e. normal to the virtual plane of reference. This means that the first bending spring 502 and the coupling element 504 rigidly follow motions of the end part 500 in the out-of-plane direction. In FIG. 5A all elements 500, 502, 504 are shown to have the same thickness, but this is not mandatory as long as the rigid coupling is achieved.

In the top view of FIG. 5B it can be seen that the first bending spring 502 and the second bending spring 506 are considerably narrower (dimension in the virtual plane of reference) than the end part 500 of the first suspender and the coupling element 504. When the end part 500 moves in the out-of-plane direction, its projection in the X direction and in the Y direction shortens, and therefore create tension to the coupling. The first bending spring 502 and the second bending spring 506 can bend between the end part 500 and the coupling element 504, rotate the coupling element about an axis normal to the virtual plane of reference. Due to this, the combination responds resiliently to the tensions in the coupling. This reduces significantly the risk of breakages in the coupling between the suspender and the reflector.

The exemplary structure has been illustrated in FIGS. 5A and 5B by means of the detail view of the coupling between the second end of the first suspender and the reflector. As shown in FIG. 2, the coupling can be repeated in one or more of the other suspenders, as well. For a person skilled in the art it is also clear that other coupling configurations providing the necessary rigidness in the out-of-plane direction and elasticity in the X and Y directions may be applied with the scope. As an example of an alternative, FIG. 6 shows a configuration where the combination of the first and second springs and the coupling element of FIG. 5 have been replaced by a simple meandering spring 602 that couples the end part 600 of the first suspender to the reflector. The meandering spring 602 is thick enough to couple the edge point 604 of the reflector to rigidly follow motions of the end part 600 in the out-of-plane Z direction, but respond resiliently to motions of the end part at least in the X direction.

Figure 7:
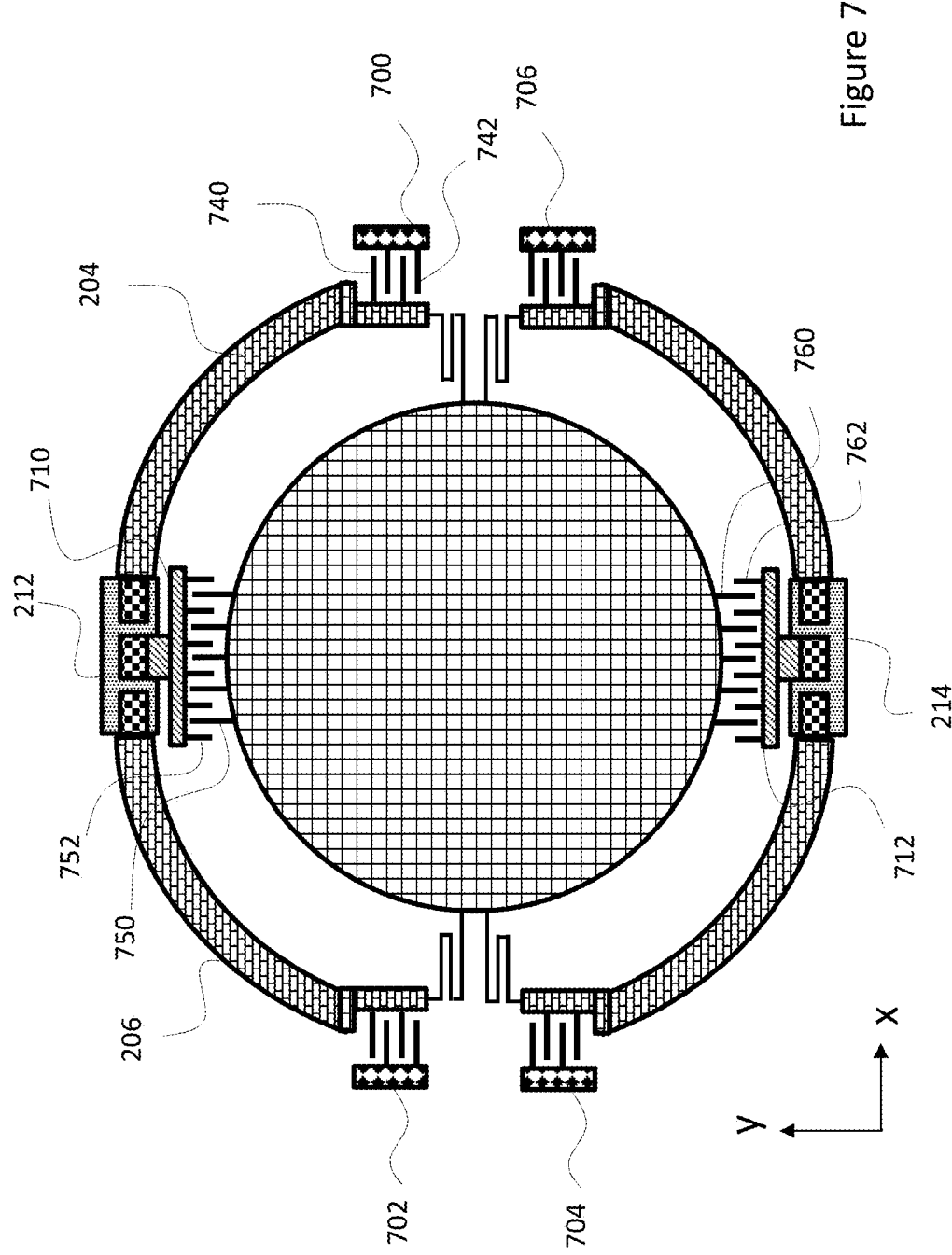
FIG. 7 illustrates a configuration with tuning elements.

The structures described in FIGS. 2 to 5 are ideal designs, but miniaturized elements are practically always affected by manufacturing tolerances, due to which realized dimensions of a structure may deviate from the designed ones, and the element does not operate as planned. In order to overcome this, a further tuning system may be included into the reflector system. The tuning element refers here to an electric transducer acting on the X and/or Y mode oscillations according to a control signal from the control element. Tuning means additional actuation to the oscillating resonator, either to suppress or enhance the realized displacements in such a way that the oscillation frequency is changed. The electric transducer can be a capacitive or piezoelectric transducer coupled to the reflector, or to one or more of the suspenders. FIG. 7 illustrates a configuration where the structure of FIG. 2 has been complemented with a tuning element formed of electric transducers 700, 702, 704, 706, 710 and 712. In FIG. 7, the first set of tuning elements 700, 702, 704, 707 can be applied to tune both the X mode oscillation and the Y mode oscillation. The second set of tuning elements 710, 712 can be applied to tune the X mode oscillation.

A tuning element in the first set of tuning elements 700, 702, 704, 706 may include a rotor comb rigidly coupled to move with a suspender. In the example illustrated in FIG. 7, each tuning element in the first set of tuning elements includes a rotor comb rigidly coupled to move with a respective suspender. For example, a tuning element 700 includes a rotor comb 740, comb fingers of which protrude in the in-plane direction away from a reflector in a region in the outer edge of the second end of the first suspender 204. The rotor comb 740 is thus rigidly coupled to move with motions of the first suspender 204. The rotor combs extend over one fourth or less of the length of the outer edge in the second end of the respective suspender. The tuning elements in the first set of tuning elements may include also a stator comb fixed to the support and thereby to the control element. For example, the tuning element 700 includes a stator comb 742, comb fingers of which protrude in the in-plane direction towards the reflector and are interdigitated with comb fingers of the rotor comb. A potential induced between the stator comb 740 and the rotor comb 742 creates an electrostatic force to an extent controlled by the control element. The electrostatic force acts on displacements of the suspender, and thus to the oscillating frequency of the suspender. The symmetrical configuration of tuning elements in FIG. 7 is advantageous, but other configurations tuning element configurations may be applied within the scope.

A tuning element in the second set of tuning elements may include a rotor comb rigidly coupled to move with the reflector, and a stator comb fixed to a fixing point. A first tuning element 710 includes a rotor comb 750, comb fingers of which are coupled to move with the reflector, and protrude in the in-plane direction away from the reflector. Correspondingly, a stator comb 752 is fixed to the first fixing point 212 and its comb fingers protrude in the in-plane direction towards the reflector. A second tuning element 712 includes a rotor comb 760 coupled to move with the reflector, and a stator comb 762 fixed to the second fixing point 212. Through the fixing points, the stator combs can be easily coupled to the control element to induce a controlled potential between respective rotor combs and stator combs. The electrostatic force between a stator comb and a rotor comb acts, to an extent controlled by the control element, on displacements of the reflector, and thus to the X mode oscillation of the reflector.

As shown in FIG. 7, electrical connections to the suspenders 204, 206 and thereby to the rotor combs 740 of the tuning elements 700, 702, 704, 706 in the first set of tuning elements, and electrical connections to the stators 752, 762 of the tuning elements 710, 712 in the second set of tuning elements can be led through respective fixing points 212, 214. Leads to suspenders 204, 206 that are fixed to a common fixing point 212 may be separate or common. A lead to a stator comb 752 fixed to the same common fixing point 212 can be separate from the leads to the suspenders 204, 206.

Figure 8:
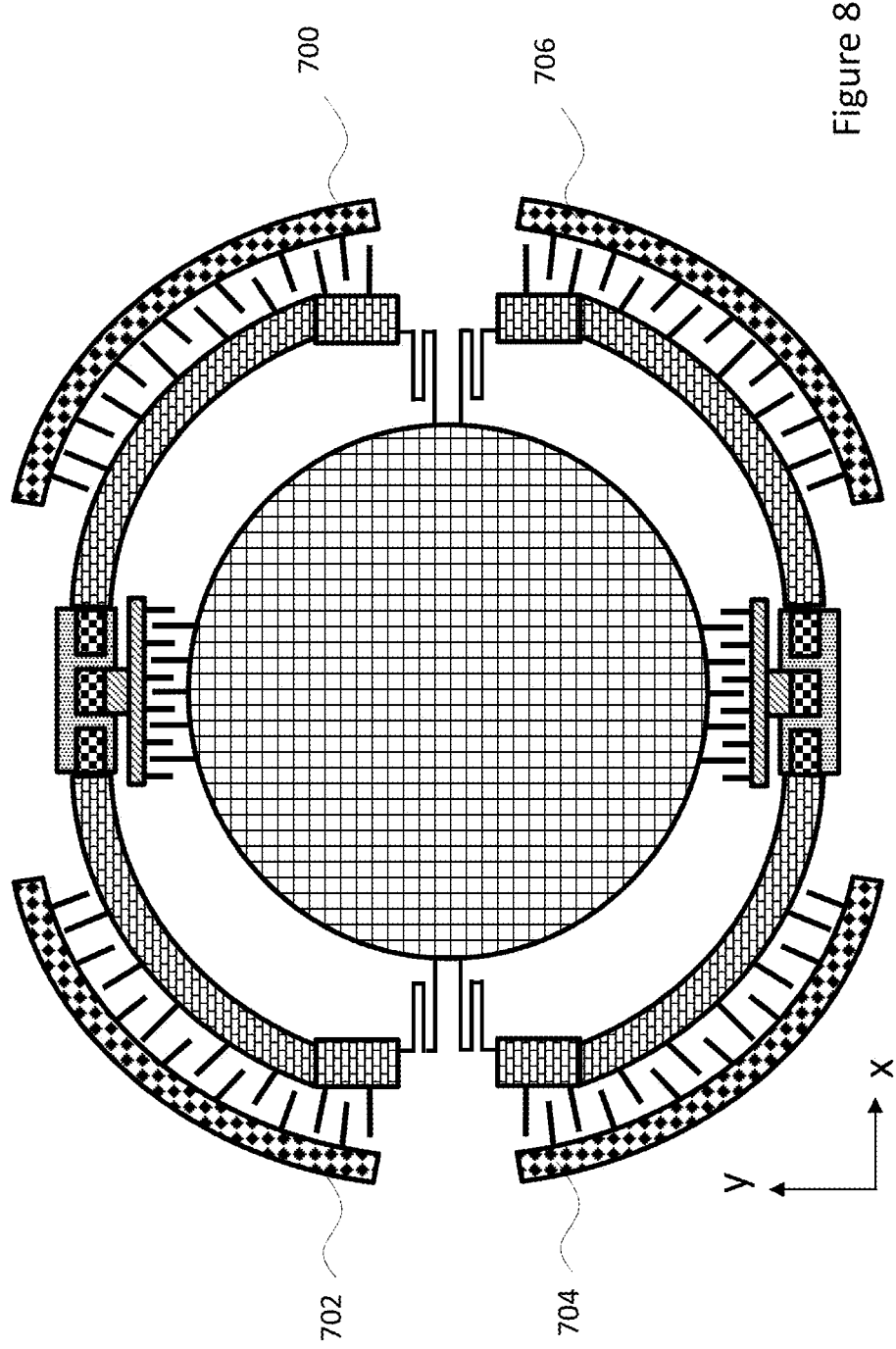
FIG. 8 shows an alternative reflector system configuration.

For a person skilled in the art, it is clear that other comb structures may be applied within the scope, as well. FIG. 8 shows an alternative reflector system that corresponds by far with the configuration of FIG. 7. The rotor combs of the tuning elements 700, 702, 704, 706 in the first set of tuning elements protrude outwards from outer edges of the suspenders, and are rigidly coupled to move with respective suspenders. Stator combs, comb fingers interdigitated with comb fingers of the rotor combs are positioned to create necessary electrostatic forces that act on respective suspenders. However, in this structure, the rotor combs extend over at least one third of the length of the outer edge of the respective suspender. The configuration of FIG. 7 is advantageous in that the combs are positioned in regions where the out-of-plane motion of suspenders is the largest. This means that a required tuning effect can be achieved with small-sized tuning elements. On the other hand, the tuning elements of FIG. 8 act on larger portions of suspenders, and therefore produce a more uniform electrostatic force over larger mirror displacement amplitude.

Accordingly, the proposed configuration enables easy implementation of further tuning elements. It is noted that the comb structures shown in FIGS. 7 and 8 are good examples, because they are simple and also readily consider necessary connections to the control element. For a person skilled in the art it is, however, the configurations may be modified within the claimed scope.

Figure 9:
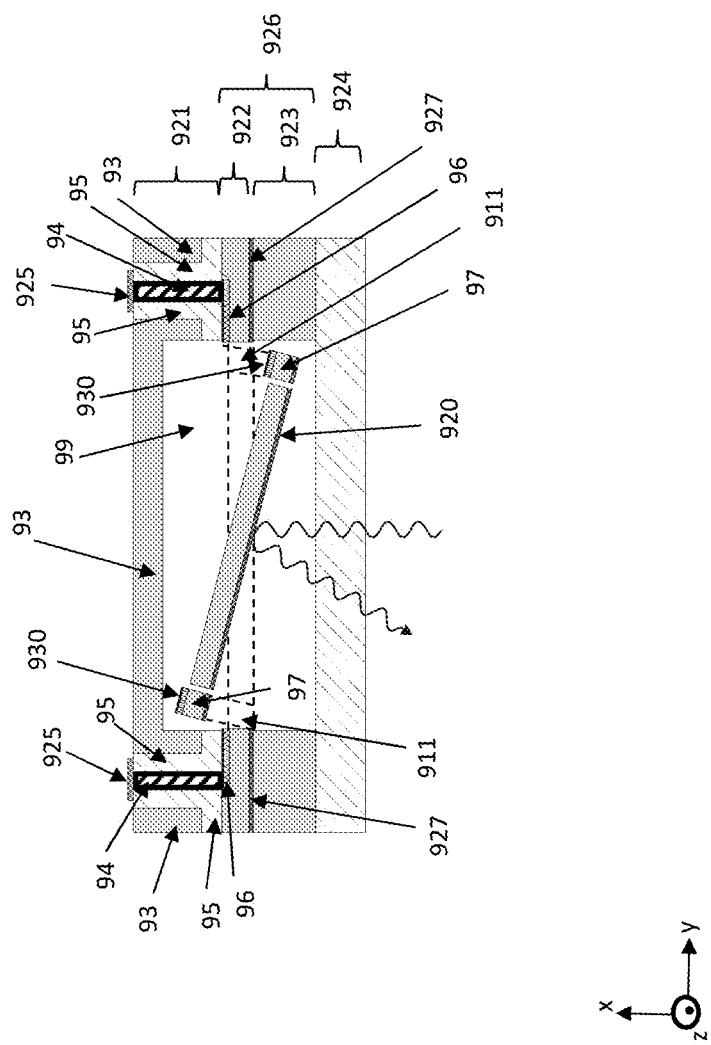
FIG. 9 is a schematic cross-section of an exemplary MEMS device including the disclosed reflector system.

Embodiments of the invention include also an optical device that includes the microelectromechanical reflector system described with FIGS. 2 to 9. FIG. 9 is a schematic cross-section of an exemplary optical MEMS device including the reflector system described with FIGS. 2 to 7. The cross-section is schematic because some of the depicted components may in reality be located at different z-coordinates and may therefore not be present in the same xy-cross-section.

The exemplary device comprises a cap wafer 921 with electrical contact pads 925, a SOI (Silicon on Insulator) structure wafer 926 which comprises movable parts, and a glass cap wafer 924 which provides an optical window for the mirror plate. The three wafers 921, 926 and 924 may be prepared separately and bonded to each other around the edges to form the reflector device. Together the wafers 921, 926 and 924 form a cavity 99 where the reflector can oscillate.

The structure wafer 926 comprises a device layer 922, a buried oxide layer 927 and a handle layer 923. SOI wafers with this structure can be fabricated with well-known bonding and thinning techniques. The device layer 922 can be prepared with lithography and silicon etching techniques well-known to a person skilled in the art. The etching technique is preferably deep reactive ion etching (DRIE). The device layer comprises a reflector with a silicon plate 98 and a reflective coating 920. The coating can be formed on the plate with a thin-film deposition method such as vacuum evaporation or sputtering. The thickness of the device layer may be in the order of a few tens of μm, but it can be optimized according to need considering the desired reflector area, tilt angles and resonance frequency. SOI wafers are available at different device layer thicknesses ranging from a few μm to 100 μm or more. The device layer also comprises suspenders and actuators. The suspenders 97 are shown schematically in FIG. 9, carrying piezoelectric layers 930 on top.

The cap wafer 921 is a silicon wafer containing the electrical connections by which the reflector device can be operated. The cap wafer comprises contact pads 925, a silicon substrate 93 with a recess for the cavity 99, and conductive vias 94. The contact pads provide an connection through which an external control element can be connected to the actuators, possible sensing elements and possible tuning elements of the reflector system. The conductive vias 94 may comprise doped single-crystal silicon which has been etched from the doped single-crystal silicon substrate 93 of the cap wafer 921. The conductive vias may be surrounded by an insulating layer 95. The insulating layer 95 can for example be glass or silicon dioxide.

Lateral electric contacts 96 shown in FIG. 9 extend to the piezoelectric actuators which are aligned with the y-axis in device layer 922 (these actuators have been excluded from FIG. 9 for clarity). The gas pressure within the cavity 99 may be lower than the gas pressure surrounding the device if resonance oscillation is sought.

FIG. 10 illustrates a scheme of an optical MEMS device in a package that includes a first element 1000 and a second element 1002. The first element 1000 may include the microelectromechanical reflector system of FIG. 2, and the second element 1002 may include an electrical circuit 1002 that is electrically connected to the first element. The electrical circuit 1002 may include the control element of the microelectromechanical reflector system.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A microelectromechanical reflector system comprising:
a support;
a reflector, a peripheral edge of the reflector including edge points;
suspenders including piezoelectric actuators and suspending the reflector from the support;
a control device, wherein
two pairs of suspenders are fixed from two fixing points to the support such that in each pair of suspenders, first ends of a pair of suspenders are fixed to a fixing point common to the pair,
a first axis of rotation is aligned to a line running though the two fixing points, and divides the reflector to a first reflector part and a second reflector part;
in each pair of suspenders, a second end of one suspender is coupled to the first reflector part and a second end of the other suspender is coupled to the second reflector part;
the control device is coupled to the piezoelectric actuators of the suspenders;
the control device is configured to provide control signals to the piezoelectric actuators to simultaneously drive the reflector to a first rotary oscillation about the first axis of rotation in a first resonance frequency, and to a second rotary oscillation about a second axis of rotation in a second resonance frequency, wherein the first axis of rotation and the second axis of rotation are orthogonal, the resulting position of the reflector is a superposition of the first rotary oscillation and the second rotary oscillation, and the first resonance frequency and the second resonance frequency are different but integer multiples of a common numerical value;
the reflector system comprises a tuning element comprising an additional movable electrode and a stationary electrode fixed to the support;
the additional movable electrode is fixed to the reflector to move with deflections of the reflector, or the additional movable electrode is fixed to the suspender to move with deflections of the suspender;
the movable electrode is capacitively coupled to the stationary electrode; and
the control device is configured to provide an additional controlled voltage between the movable electrode and the stationary electrode.

2. A microelectromechanical reflector system of claim 1, wherein
a first pair of the two pairs of suspenders includes a first suspender and a second suspender, a first end of the first suspender and a first end of the second suspender fixed from a first fixing point to the support,
a second pair of the two pairs of suspenders includes a third suspender and a fourth suspender, a first end of the third suspender and a first end of the fourth suspender fixed from a second fixing point to the support, and wherein
the first axis of rotation is aligned to a line running though the first fixing point and the second fixing point.

3. A microelectromechanical reflector system of claim 2, wherein
the edge points include a first edge point and a second edge point, each of which coincides with the first axis of rotation;
the first fixing point is adjacent to the first edge point, separated by a gap; and
the second fixing point is adjacent to the second edge point, separated by a gap.

4. A microelectromechanical reflector system of claim 2, further comprising:
a third edge point and a fourth edge point in an edge of the first reflector part;
a fifth edge point and a sixth edge point in an edge of the second reflector part; wherein
the third edge point and the fourth edge point are separated by a non-zero distance,
the fifth edge point and the sixth edge point are separated by a non-zero distance,
a second end of the first suspender is coupled to the third edge point,
a second end of the second suspender is coupled to the fifth edge point,
a second end of the third suspender is coupled to the sixth edge point, and wherein
a second end of the fourth suspender is coupled to the fourth edge point.

5. A microelectromechanical reflector system of claim 4, wherein
the second axis of rotation is parallel to a line running through the third edge point and the fifth edge point on a plane determined by the third edge point, the fifth edge point and at least one of the fourth edge point and the sixth edge point.

6. A microelectromechanical reflector system of claim 1, wherein in a non-actuated state, an outer surface of the planar reflector is aligned to a first plane, a direction parallel to a normal to the first plane is an out-of-plane direction; and the coupling between a second end of at least one suspender and an edge point to which the suspender is coupled includes a first coupling spring that relays deflection of the second end of the suspender to the edge point in the out-of-plane direction, and responds flexibly to deflection of the second end of the suspender in at least one in-plane direction parallel to the first plane.

7. A microelectromechanical reflector system of claim 1, wherein the movable electrode is a movable comb electrode, and comb fingers of the movable comb electrode extend over one fourth or less of the length of the outer edge in the second end of the respective suspender.

8. A microelectromechanical reflector system of claim 1, wherein the movable electrode is a movable comb electrode, and comb fingers of the movable comb electrode extend over at least one third of the length of the outer edge in the second end of the respective suspender.

9. An optical device including the microelectromechanical reflector system of claim 1.

\* \* \* \* \*